April 16, 1963 P. E. CHANEY ET AL 3,086,167
BORE HOLE LOGGING METHODS AND APPARATUS
Filed Nov. 13, 1958 3 Sheets-Sheet 1

INVENTORS
PRESTON E. CHANEY,
FRED M. MAYES &
JOHN D. BENNETT
ATTORNEYS

April 16, 1963    P. E. CHANEY ET AL    3,086,167
BORE HOLE LOGGING METHODS AND APPARATUS
Filed Nov. 13, 1958    3 Sheets-Sheet 2

INVENTORS
PRESTON E. CHANEY,
FRED M. MAYES &
JOHN D. BENNETT
BY
ATTORNEYS

April 16, 1963 P. E. CHANEY ET AL 3,086,167
BORE HOLE LOGGING METHODS AND APPARATUS
Filed Nov. 13, 1958 3 Sheets-Sheet 3

INVENTORS
PRESTON E. CHANEY,
FRED M. MAYES &
JOHN D. BENNETT
ATTORNEYS 3,086,167
BORE HOLE LOGGING METHODS AND
APPARATUS
Preston E. Chaney, Dallas, and Fred M. Mayes and John D. Bennett, Richardson, Tex., assignors to Sun Oil Company, Philadelphia, Pa., a corporation of New Jersey
Filed Nov. 13, 1958, Ser. No. 773,652
7 Claims. (Cl. 324—1)

This invention relates to bore hole logging methods and apparatus and particularly to methods which involve the location of recording apparatus within a hole.

Conventional methods of well logging, whether of electrical or other types, involve the absence of the drill stem during the logging operation. This has two serious drawbacks in that not only must special time be consumed in running the well log, during which time the drill stem must be out of the hole, but after a period of drilling, due to the fact that the drill stem must be removed, there is inevitably a delay before the new part of the hole may be logged, during which delay there occurs invasion of the formation by drilling liquid. Since the drilling liquid has physical properties of its own, it may, by penetration of porous layers, greatly change their properties so as to interfere with their detection. For example, in the case of electrical logging, the conductivity of the liquid will effect changes in the apparent conductivity of the formations; and in the case of acoustic logging the absorption and velocity of sound will be changed, etc.

Proposals have been made to effect electrical logging by using the drill bit or one or more other parts of the drill stem as logging electrodes. In line with this it has been proposed to supply special drill stem tubing containing one or more conductors which are electrically connected in the assembly of the drill stem and extend to recording apparatus at the surface. The use of such an arrangement has been found to be impractical because of high cost and wear.

Proposals have also been made to support one or more electrodes on wire lines to be dropped below a core bit into the lower portion of a hole from which the bit has been raised. This procedure has also proved impractical inasmuch as special handling has been required at the surface, but particularly because core bits are not generally desired for the major drilling activities but are used only for special purposes.

Improved logging methods and apparatus are disclosed in the application of Fred M. Mayes and Jack Weir Jones, Serial No. 683,027, filed September 10, 1957, and the application of John Bennett, Preston E. Chaney, Jack Weir Jones and Fred M. Mayes, Serial No. 685,717, now Pat. No. 3,047,794, filed September 23, 1957. The logging methods and apparatus so disclosed may be used when a drill string is in a bore hole and may be used at any time with a minimum of interruption in drilling. Not only may the logging be accomplished just prior to removal of the drill string for the purpose of changing a bit, but the logging may be carried out to be promptly followed by a continuation of drilling. In brief, a self-contained energizing and recording apparatus may be dropped through a drill string in go-devil fashion or may be pumped down therethrough when the drill string has been lifted to only a limited extent from the bottom of the hole to provide a region for reception of an electrode or other logging assembly. The apparatus is of a type suitable to pass through the mud flow openings of a jet bit which may be of any of the conventional popular types. Such bits are presently widely used since they effect the carrying away of cuttings and avoid their reworking by the drill. These jet openings are generally at relatively small angles with respect to the drill stem axis and a flexible assembly may, accordingly, be projected therethrough to extend beneath the bit. For electrical logging the assembly is an electrode assembly; for acoustic or other logging it may be of suitable type for exposure to the walls of a hole.

The self-contained assembly which is lowered to the vicinity of the bit contains, for electrical logging, not only means for supplying current to the earth, but also means for recording various potentials at the electrodes of the assembly. The recording, as disclosed in said applications, may be effected magnetically.

Reference may also be made to the application of John D. Bennett, Preston E. Chaney, Jack Weir Jones and Fred M. Mayes, Serial No. 685,718, filed September 23, 1957.

In accordance with the foregoing disclosures, special means were provided to insure that a flexible wand would properly enter and pass through the bit openings. In the first two applications mentioned above, a funnel-shaped extension was provided for one of the bit holes to receive and guide the wand therethrough. In the last mentioned application an arrangement of balls was provided to be acted upon by the mud flow to guide a wand through a bit opening. Tests have shown that these special expedients are not required for the purpose of guiding the end of a flexible wand through bit openings provided that the wand has sufficient flexibility at least at its lower end to be readily directed by mud flow to and through an opening. The avoidance of special provisions for causing a proper passage of a wand through a bit would be highly desirable, but it is also desirable to have insurance against any maloperation which becomes more and more likely as the wand is made more flexible. The problem involved is the following:

If a wand is quite flexible, during the descent of the apparatus within a drill pipe it may whip around considerably and if there is any restriction by friction or obstructions encountered by it it may hang up within the drill string and be collapsed and damaged by the descent of the recording part of the apparatus. Furthermore, as the wand comes close to the openings in a bit it may be whipped about by the turbulence of the mud flow in conjunction with its own rapid descent and if deviated from the mud stream approaching the openings may engage portions of the bit at the sides of the openings and become collapsed by the rapid downward movement of the recording housing. It would be desirable, therefore, to slow down its approach to the bit so as to give ample time for its proper entrainment in the mud stream or streams so that it would pass smoothly through one of the bit openings. It has been found that while generally no difficulties are encountered even without slowing down the apparatus, there may be instances where maloperation occurs and since the apparatus is expensive provisions are desirable to insure that even remotely possible troubles will not occur.

The present invention is particularly designed to avoid such troubles. In accordance with the invention the descent of the upper recording portion of the apparatus is retarded, desirably throughout its entire descent but particularly at the time when the lower end of a wand is closely approaching a bit. When such retarding action is provided, a wand having quite considerable flexibility, though of sufficient stiffness to pass downwardly along the walls of a bore hole below the bit, may be used. Consistently with this, no special structure need be provided at the bit which may be of conventional jet type. Further the wand may be provided with nothing more than a rounded end, without the use of guiding balls or the like. Entrainment of the wand end in the mud stream is sufficient to insure guidance since the entry will take place relatively slowly.

The objects of the invention relate to the attainment of the foregoing results and will become more apparent from the following description, read in conjunction with the accompanying drawings, in which.

Figure 1:
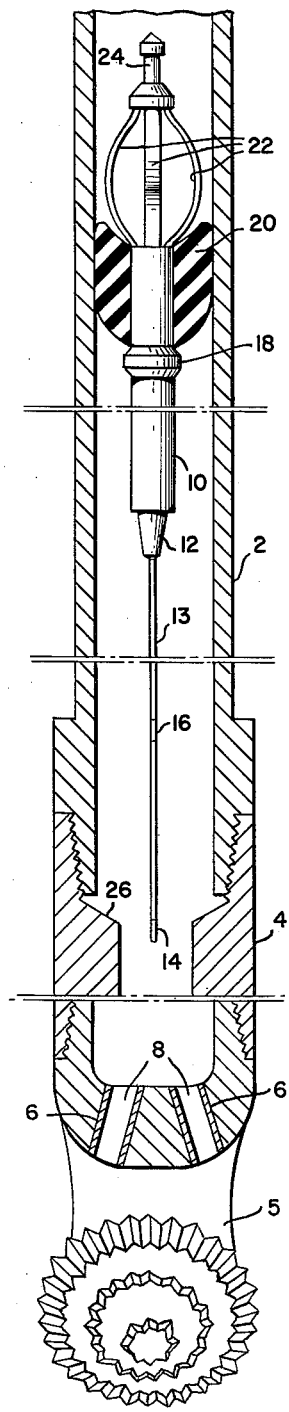
FIGURE 1 is an axial sectional view showing, in particular, the approach of the logging apparatus to the drill collar of a drill stem, the apparatus passing through the portion of the stem above the collar.

Details of the apparatus are not shown herein since the recording elements and the general wand construction are shown in detail in the first two applications referred to above to which reference may be made. As already indicated, the present invention is concerned primarily with the external aspects of the apparatus and their relationships to the drill string and the mud flow. It will, therefore, be understood that the logging apparatus may comprise any suitable recording apparatus for electrical or other logging and that the wand may be of a suitable type for the type of logging which is being carried out; the wand may carry electrodes if electrical logging is being performed, or it may contain acoustic, radioactive, high frequency, or other elements in the cases of other types of logging. For simplicity of description, however, the apparatus will be described as it would be for electrical logging, being of a construction corresponding to that of said prior applications.

A conventional hollow drill stem is indicated at 2, this drill stem comprising at its lower end the usual drill collar 4 carrying the bit 5 provided with mud flow openings 6 desirably lined, as usual, with erosion-resisting liners 8.

A casing 10 carrying recording apparatus supports through an adaptor 12 a flexible wand 13 which may be of the type disclosed in said prior applications, which wand, for electical logging, carries electrodes such as 14 and 16 disposed in any desirable electrode array. The arrangement is such that ultimately the wand is projected through the bit so that the electrodes are exposed to the walls of the hole below the bit with adequate spacing from the bit so as to provide the desired electrical configuration. In accordance with the present invention the wand may be more flexible than the wands provided for use in accordance with the foregoing applications, so as to be guided more readily by the mud flow. Nevertheless the wand should have sufficient stiffness to be pushable against frictional retardation by force applied to its upper end so that it will tend to glide smoothly, while remaining extended, through the jet openings and along the wall of a hole.

The recording apparatus casing 10 is provided with a collar 18 about its upper portion below its top, and above this collar 18 there is located a guide or packer 20 of rubber or the like which in its expanded condition is approximately equal in diameter to the diameter of the bore of the portion of the drill stem above the drill collar. Secured to the upper end of the casing are three or more bowed springs 22 which in their outwardly extended condition would have an envelope of greater diameter than the drill collar opening which has a smaller diameter than the bore of the drill stem thereabove. At their upper ends these spring members may be connected by a spearhead 24 of conventional shape to be seized by an overshot for the purpose of removing, if desired, the logging apparatus. The difference in internal diameters of the drill pipe and the drill collar provide a shoulder 26.

In the operation of the assembly, it is made up as shown in FIGURE 1 with the packer 20 frictionally held on the upper portion of the casing 10 above the collar 18. The springs 22 due to the fact that they are bowed outwardly will prevent accidental removal of the packer from the casing. The assembly, with the recording apparatus set for operation, including energization of one or more electrodes, is inserted in the upper portion of the drill stem, which is then provided with its conventional mud flow connections. Desirably, the friction between the packer and the drill stem is such as to prevent free fall of the logging apparatus, though this is not essential provided that the packer will effect at least retarding of downward movement which would ordinarily require some relative flow of mud about the packer. The apparatus may then be pumped down through the drill stem, the rate of descent being under control by controlling the rate of flow of the mud. In view of this, the speed of descent is such that the wand will ordinarily extend substantially vertically, possibly resting on and sliding upon the wall of the drill stem if the hole is inclined. At any rate, due to the slow descent there is good insurance against the possibility that even if the wand temporarily has its lower end arrested by any obstruction in the drill stem it will free itself due to its stiffness, even though slight, before it can be buckled by the descending casing.

Figure 2:
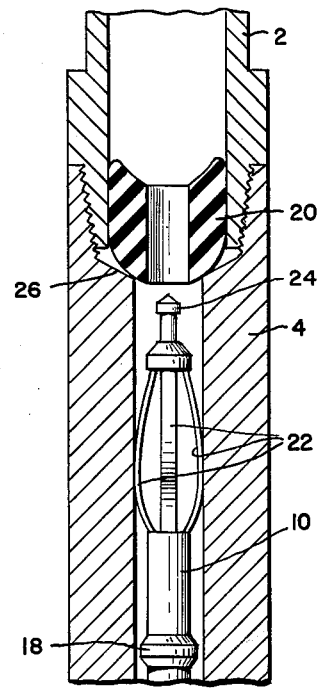
FIGURE 2 is a similar view but showing a later stage of the operation, the recording apparatus having entered the drill collar.

This condition of descent continues until the packing reaches the shoulder 26 by which it will be arrested. Continuation of the pumping will then force the casing 10 downwardly out of the packing, the spring members 22 as well as the resilient packing yielding to permit the passage of these members through the packing opening. The resulting condition following this is as illustrated in FIGURE 2. Desirably the collar 18 has a diameter which is a fairly large fraction of the diameter of the bore of the drill column, thereby effecting restriction of mud flow to serve the purpose of providing sufficient pressure to force the casing downwardly. At this time the spring members 22 will be compressed to enter and move through the reduced diameter of the drill collar bore, and they are desirably of such stiffness as to provide considerable retardation of the movement of the apparatus so that the apparatus will move downwardly at a linear velocity less than that of the mud. At this time, in fact, the rate of mud flow may be increased so that it will have a relatively high velocity past the wand so that the lower end of the wand, by reason of its flexibility will be directed by the mud stream. The linear velocity of flow of the mud still further increases in the immediate vicinity of the openings in the bit so that as the lower end of the wand approaches these openings it will be guided into and through one of them. Due to the slowing down of the descent, the approach of the lower end of the wand to the bit is at sufficiently low velocity that even if disturbances by turbulence exist the lower end of the wand will nevertheless find and enter one of the bit openings under the guidance of the mud flow. As a result there is very effective insurance against any maloperation. With the wand fully extended, logging is carried out as described in said prior applications.

Figure 3:
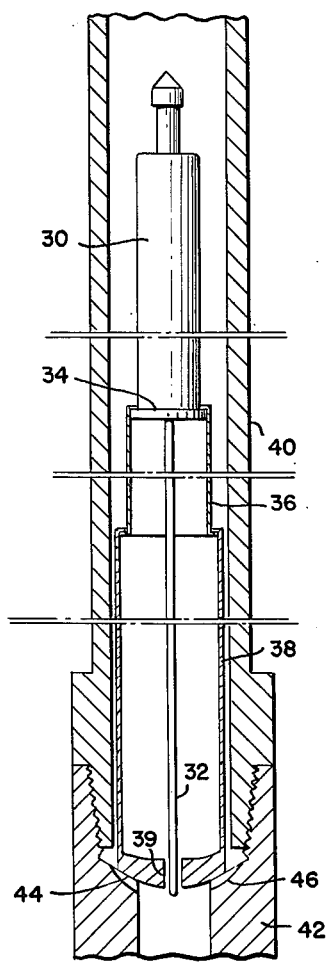
FIGURE 3 is a similar section but showing an alternative form of apparatus which may be used.

The modification in FIGURE 3 shows still another type of operation in which retarding of movement of the apparatus occurs only as it is approaching the drill collar, though possible buckling of the wand is also prevented during the descent of the apparatus through the drill pipe. In this modification the casing is indicated at 30 and the wand at 32. At the lower end of the casing there is provided a collar 34 having a diameter slightly greater than the casing. Arranged to slide over this collar 34 is an upper sleeve 36 loosely fitting thereover and provided with inturned portions to prevent its dropping from the collar. Below this sleeve 36 there is a second sleeve 38 similarly arranged with respect to the first, embracing loosely a collar or flange on the first sleeve. As will be evident from the figure the sleeves are arranged to telescope with respect to each other and with respect to the casing 30. The lower sleeve 38 has a weighted lower end provided with a central opening 39 through which the nose of the wand 32 extends. The drill pipe 40 carries the instrument stop 42 which has an internal diameter less than that of the drill pipe providing a shoulder 44 through which the lower sleeve 38 cannot pass. Mud flow openings or slots 46 are desirably provided to enable mud to by-pass this shoulder even when it is engaged by the sleeve 38.

In the use of this apparatus the assembly is made up with the sleeves extended as shown in FIGURE 3. It may then be inserted in the drill stem to drop freely through the mud therein which will enter the loosely fitting sleeves to displace air. As descent takes place the usual mud flow connections may be made at the top of the drill stem, but in this case, the apparatus need not be pumped down.

Despite the fact that the downward motion is not retarded, there is avoidance of any possibility of buckling the wand 32 because it is encased in the sleeves 36 and 38.

When the apparatus reaches the position illustrated in FIGURE 3 and the lower sleeve 38 engages the shoulder 44, the apparatus is arrested but with a cushioning action due to the fact that the casing 30 cannot further descend without displacing mud from the sleeves and effecting their collapse. Since, while clearances are provided, they restrict this escape of mud, the further descent of the casing and wand is slowed down with the result that the wand approaches the bit relatively slowly and time is provided for the proper entry of the wand into a bit opening under the guidance effected by the mud flow which passes downwardly outside the lower sleeve 38 and through the by-passes 46. Finally, the sleeves 36 and 38 will be completely collapsed with the casing 30 resting on the bottom of the sleeve 38 and with the wand 32 fully extended through a bit opening. Logging operation is then effected in the fashion disclosed in said prior applications, it being understood that the bit prior to the descent of the apparatus will have been raised from the bottom of the hole a sufficient distance to accommodate full projection of the wand.

It will be understood that the sleeves 36 and 38 should be sufficiently long to enclose, when extended, at least the major portion of the wand length. More than two sleeves may, of course, be provided to secure sufficient overall sleeve length.

Figure 4:
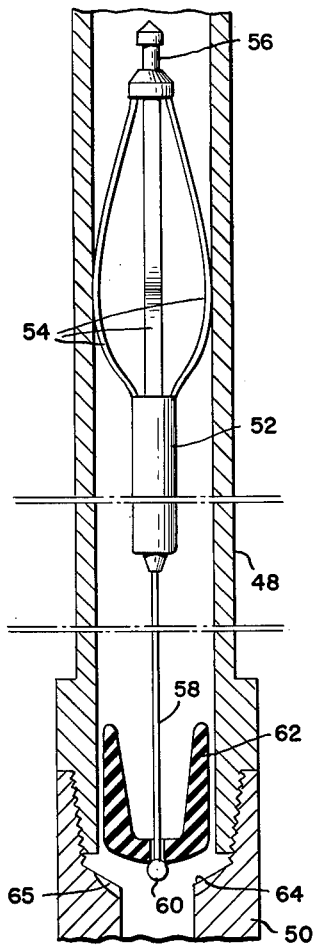
FIGURE 4 is a further similar section showing another modification of the invention.

In the modification illustrated in FIGURE 4, the drill pipe is illustrated at 48 and the drill collar at 50. In this modification, the casing is retarded in its descent through the drill pipe while there is provided a loosely fitting piston through which the mud will force the apparatus downwardly by tensioning the wand. The casing 52, in this case, is provided with three or more relatively stiff spring members 54 which bow outwardly into relatively tight frictional engagement with the inner walls of the drill pipe, these being connected at their upper ends by the spearhead 56. The wand 58 in this case is provided with an enlargement 60 above which it is surrounded by a piston member 62 of rubber or similar material which has an outside diameter somewhat less than the internal diameter of the drill pipe but greater than the internal diameter of the drill collar, these diameters providing the shoulder 64 for arrest of the piston member, there being provided the mud by-passes 65.

In operation the assembly is introduced into the drill stem and pumped down, the spring members 54 preventing free fall of the apparatus, while the piston member 62 closes the bore to a sufficient extent so that the mud flow forces the apparatus downwardly. When the piston member 62 is seated at 64 the flow of mud is retarded but continues to pass through the by-passes 65. Continued downward drive of the apparatus is effected at a lower rate by reason of the throttling of the mud flow so that the wand approaches the bit openings slowly, eventually entering one of them so pass downwardly. The dimensions are so chosen that the wind is fully extended beyond the bit when the casing 52 finally comes to rest within the seated piston member 62.

Figure 5:
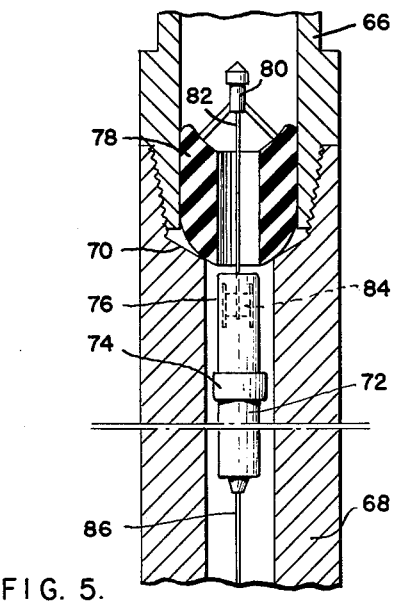
FIGURE 5 is a section showing a further modification.

In the arrangement illustrated in FIGURE 5 the drill stem is shown at 66 and the drill collar at 68. A shoulder 70 is provided by the reduction of internal diameter from the drill pipe to the drill collar. The instrument casing is illustrated at 72 and is provided with a collar 74 below its upper end leaving a portion 76 over which in initial assembly there is located the rubber sleeve 78, the construction in this respect being similar to that shown in FIGURES 1 and 2. In the present instance, however, the member 78 carries by a spider arrangement a spearhead 80 to which is secured the upper end of a wire cable 82 which is wound upon a drum 84 mounted within the upper end of the instrument casing. This drum may be provided with a retarding brake (not shown).

As the assembly is lowered, with the member 78 originally surrounding the upper end of the instrument casing, the assembly is pumped down by the mud as in the case of the arrangement described in connection with FIGURES 1 and 2. The wand 86 accordingly descends at a low rate sufficient to prevent possible buckling. When the member 78 reaches the shoulder 70 mud flow is temporarily cut off and increases pressure above the instrument 72 with the result that it is forced out of the member 78 and downwardly by the mud flow at a rate which is retarded by the unreeling of the cable 82. This provides a slow approach of the wand to the bit so that it will properly enter an opening therein.

Figure 6:
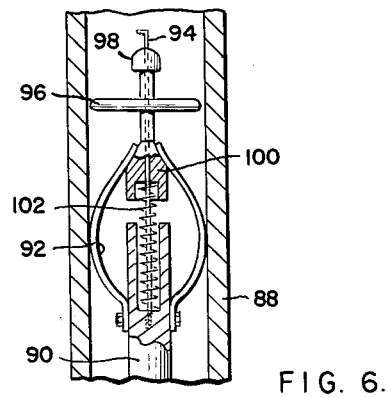
FIGURE 6 is a section showing still another modification of the invention.

In the further arrangement illustrated in FIGURE 6 the drill pipe is indicated at 88. The casing 90 which supports the wand (not shown) is in this case provided with bowed spring members 92 arranged to drag on the pipe walls. A central pin 94 supported at the upper end of the casing 90 has slidable thereon a disc arrangement 96 having a diameter somewhat smaller than the internal diameter of the pipe. It is provided with a stem forming a spearhead 98 and also a conical cam 100 which is located between the inwardly directed ends of the spring members 92. A spring 102 urges the disc assembly upwardly and the cam 100 then tends to force the drag springs into tight engagement with the pipe. This engagement may be sufficient to prevent downward movement of the assembly, or the arrangement may be such that slow downward movement might occur, resisted by friction. Mud pressure acting on the disc 96 serves to oppose and compress the spring 102 the effect of this being to move the cam downwardly and thus relieve the pressure exerted on the pipe walls by the spring members. The instrument accordingly is driven downwardly by the mud with a friction retardation which depends upon the pressure exerted by the flowing mud on the disc 96. Mud velocity necessarily exceeds the velocity of the instrument casing and wand, and can be controlled so that the wand approaches a bit at a sufficiently low rate to permit proper entry of the wand into an opening under the guidance of the mud flow which moves relatively to the wand.

Figure 7:
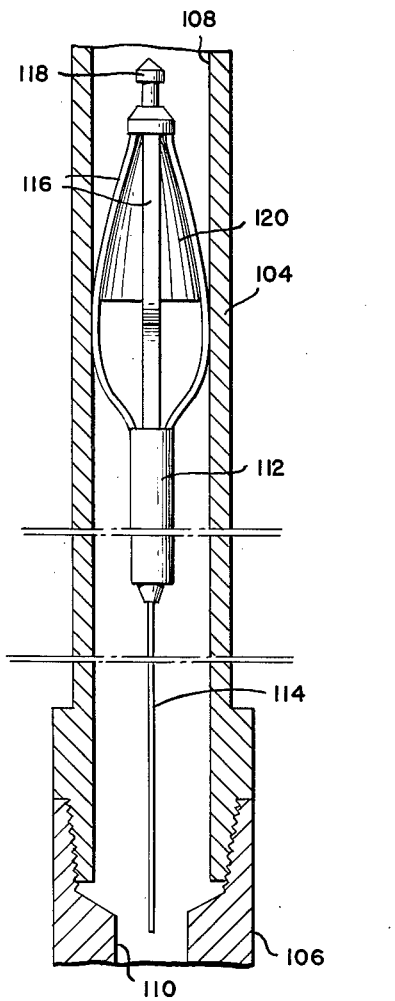
FIGURE 7 is a section showing another modification of the invention.
Figure 8:
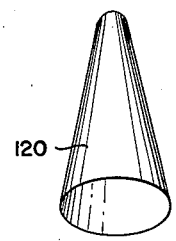
FIGURE 8 is a perspective view of a "parachute" element involved in the modification shown in FIGURE 7.

FIGURES 7 and 8 show a further modification of the invention. The drill stem is indicated at 104 and the drill collar at 106, the drill stem having an enlarged bore 108 substantially in excess of the size of the bore 110 of the drill collar. The casing for the recording apparatus is indicated at 112 and the wand at 114. The casing 112 is surmounted by the bowed springs 116 which at their upper ends are connected to the spearhead 118. To the extent just described the construction is essentially similar to that shown in FIGURES 1 and 2 with the exception that a packing means such as 20 is omitted in the case of the modification now being discussed. A "parachute" type of element 120 is provided which is carried by the spearhead and is located within the cage formed by the upper ends of the bowed springs 116. The element 120, of conical form, may be of material such as rubberized canvas or the like having either in itself sufficient stiffness normally to be expanded as illustrated or which may be secured at points about its lower circumference to the springs 116. At the same time, it should be sufficiently flexible so as to collapse under relative downward flow of the mud to provide free passage therefor.

In the operation of what has just been described, the bowed springs 116 are desirably so constructed that they exert on the wall of the drill stem little pressure so as not to substantially retard downward movement of the assembly through the drill stem. This minimizes wear on the springs. Except for the parachute element 120, therefore, the assembly would normally drop at a velocity greater than the downward velocity of the mud flow. By provision of the parachute, however, which will open under the tendency of the assembly to move downwardly faster than the mud, the assembly actually may move downwardly at a rate which only slightly exceeds that of the mud flow. Accordingly, by control of the mud flow the velocity of downward movement may be controlled so as to prevent too fast a movement of the wand which might cause it to hang up and be collapsed.

However, when the springs 116 enter the reduced bore of the drill collar they will be pressed inwardly producing substantial friction which will cause the assembly to move downwardly much more slowly than the mud. At the same time, the flow of mud will collapse the parachute element 120 so that the mud may flow freely past the assembly and so provide the flow relative to the lower end of the wand which will serve to guide it through a bit opening. Thus, there are provided in simple fashion the conditions of keeping the instrument from traveling too fast during the major part of the descent through the drill stem and providing high mud velocity relative to the wand and relatively slow movement of the wand at the time its lower end is approaching the bit.

It will be noted that in common, all of these modifications insure a downward velocity of the mud at the position of the wand exceeding the velocity of the wand itself particularly at the time when the wand is about to enter a bit opening. Thus, proper conditions are provided to insure effective guidance of the lower end of the wand. It will be evident that while a substantial amount of stiffness is required in the wand to insure the pressure of its full length freely in the portion of the hole below the bit, the wand nevertheless may be quite flexible so as to divert freely in passing through the bit opening and also along the wall of the hole below the bit.

The actual logging operation after the assembly is located at the bottom of the drill stem is carried out in the fashion described in said prior applications, provisions being made to start the recording and energizing apparatus, the drill stem being lifted for logging purposes to the desired extent. Finally, the logging apparatus may be removed by an overshot lowered on a wire line or may be recovered when the drill bit is brought to the surface.

It will be evident that the features of the invention may be carried out by other apparatus, and it is therefore to be understood that the invention is not limited except as required by the following claims.

What is claimed is:

1. Bore hole logging apparatus comprising a casing containing recording apparatus, the casing being of a size capable of being lowered through a hollow drill stem through which mud flows downwardly, the lowering being independent of supporting connection of the casing from the surface, a flexible wand extending from the bottom of said casing and comprising detecting means for conditions existing in the vicinity of a bore hole, means providing a signal channel between said detecting means and said recording apparatus for the transmission of signals from the former to the latter for recording, said wand being of a size to project through an opening for mud flow in a bit carried by the lower end of a drill stem to extend below the bit, and means for imposing restraint on the descent of the casing and wand as the lower end of the wand approaches said opening so that a vertical downward rate of mud flow through the drill stem may exceed the downward rate of movement of the wand to guide the wand into said opening.

2. Bore hole logging apparatus according to claim 1 in which the last mentioned means comprises an expandible device connected to said casing and arranged to engage frictionally the walls of a portion of a drill stem bore through which said casing descends.

3. Bore hole logging apparatus according to claim 1 comprising means connected to the assembly of said casing and wand obstructing flow of mud and arranged to be acted upon by the mud to effect downward pumping of the assembly.

4. Bore hole logging apparatus according to claim 2 comprising means connected to the assembly of said casing and wand obstructing flow of mud and arranged to be acted upon by the mud to effect downward pumping of the assembly.

5. Bore hole logging apparatus according to claim 3 in which the assembly of said casing and wand is movable relatively to the last mentioned means as the wand approaches a bit.

6. Bore hole logging apparatus according to claim 4 in which the assembly of said casing and wand is movable relative to the last mentioned means as the wand approaches a bit.

7. Bore hole logging apparatus comprising a casing containing recording apparatus, the casing being of a size capable of being lowered through a hollow drill stem, through which mud flows downwardly, a flexible wand extending from the bottom of said casing and comprising detecting means for conditions existing in the vicinity of a bore hole, means providing a signal channel between said detecting means and said recording apparatus for the transmission of signals from the former to the latter for recording, said wand being of a size to project through an opening for mud flow in a bit carried by the lower end of a drill stem to extend below the bit, and means for imposing restraint on the descent of the casing and wand as the lower end of the wand approaches said opening so that the vertical downward rate of mud flow through the drill stem may exceed the downward rate of movement of the wand to guide the wand into said opening.

References Cited in the file of this patent
UNITED STATES PATENTS

| | | |
|---|---|---|
| 2,070,912 | McDermott | Feb. 16, 1937 |
| 2,300,823 | Whitman | Nov. 3, 1942 |
| 2,349,366 | Moon | May 23, 1944 |